United States Patent
Debard et al.

(10) Patent No.: US 10,841,166 B2
(45) Date of Patent: Nov. 17, 2020

(54) COMMISSIONING AND PERSONALIZING DEVICES IN A LOCAL AREA NETWORK

(71) Applicant: NETATMO, Boulogne-Billancourt (FR)

(72) Inventors: Marie Debard, Versailles (FR); Frédéric Potter, Neuilly-sur-Seine (FR); Romain Paoli, Meudon (FR)

(73) Assignee: NETATMO, Boulogne-Billancourt (FR)

( * ) Notice: Subject to any disclaimer, the term of this patent is extended or adjusted under 35 U.S.C. 154(b) by 0 days.

(21) Appl. No.: 15/846,665

(22) Filed: Dec. 19, 2017

(65) Prior Publication Data

US 2018/0183675 A1    Jun. 28, 2018

(30) Foreign Application Priority Data

Dec. 22, 2016    (EP) .................................... 16306793

(51) Int. Cl.
*H04L 12/24* (2006.01)
*H04L 12/28* (2006.01)
(Continued)

(52) U.S. Cl.
CPC .......... *H04L 41/12* (2013.01); *H04L 12/2803* (2013.01); *H04L 12/2807* (2013.01);
(Continued)

(58) Field of Classification Search
CPC ......... H04L 12/24; H04L 12/26; H04L 12/28; H04L 12/2803; H04L 12/2807;
(Continued)

(56) References Cited

U.S. PATENT DOCUMENTS 7,605,698 B2 * 10/2009 Moriwaki ............... G01D 21/00
340/5.1
8,085,660 B2 * 12/2011 Hargrave .............. H04W 76/10
370/230
(Continued)

FOREIGN PATENT DOCUMENTS

| WO | 2004023849 A1 | 3/2004 |
|----|---------------|--------|
| WO | 2014202639 A1 | 12/2014 |
| WO | 2015049259 A1 | 4/2015 |

OTHER PUBLICATIONS

European Search Report for 16306793.7 dated Apr. 3, 2017.
(Continued)

*Primary Examiner* — Tri H Phan
(74) *Attorney, Agent, or Firm* — Meagher Emanuel Laks Goldberg & Lao, LLP

(57) ABSTRACT

The invention discloses devices and methods to commission (i.e. perform joining and binding) and, as an option to personalize, a Home/Local Area Network installed in a building. Preferably, the network is a Zigbee network. The devices comprise a Smart Electric Controller (SEC) equipped with a Zigbee T/R unit and a control circuit, and a Remote Control, equipped with a Zigbee T/R unit and an input module. The joining is triggered by a first predefined event that may be a validation by a network node of a joining request initiated on power up of the SEC or on an electromagnetic signal transmitted in a pair-to-pair communication between the SEC and a network node. The binding is triggered by a second predefined event that may be a taptap or a proximity of a SEC detected by an accelerometer or a proximity sensor embedded in the RC. It may be alternatively triggered by the validation of reception an electromagnetic signal transmitted in a pair-to-pair communication between the RC and the SEC. On binding, a table of the commands fit for controlling the SEC may be made available to the RC, so that the RC is immediately configured to operate the adequate commands.

17 Claims, 13 Drawing Sheets

(51) Int. Cl.
*H04W 4/00* (2018.01)
*H04W 4/80* (2018.01)
*H04L 12/46* (2006.01)
*H04W 8/00* (2009.01)
*H04W 84/18* (2009.01)
*H04B 3/54* (2006.01)

(52) U.S. Cl.
CPC ........... *H04L 12/4625* (2013.01); *H04W 4/80* (2018.02); *H04W 8/005* (2013.01); *H04B 3/542* (2013.01); *H04W 84/18* (2013.01)

(58) Field of Classification Search
CPC ..... H04L 12/4625; H04L 29/08; H04L 41/12; H04L 43/50; H04L 67/24; H04W 4/00; H04W 4/008; H04W 4/80; H04W 8/00; H04W 8/005; H04W 84/12; H04W 84/18; H04B 3/542
See application file for complete search history.

(56) References Cited

U.S. PATENT DOCUMENTS

| | | | | |
|---|---|---|---|---|
| 8,149,849 B2* | 4/2012 | Osborn | ............... | H04L 29/1283 370/401 |
| 8,320,931 B2* | 11/2012 | Ward | ............... | H04W 60/04 455/456.1 |
| 8,880,204 B2* | 11/2014 | Frei | ............... | H04L 29/1249 700/90 |
| 9,386,401 B2* | 7/2016 | Gold | ............... | H04W 4/023 |
| 9,410,712 B2* | 8/2016 | Smith | ............... | G06F 16/33 |
| 9,634,928 B2* | 4/2017 | Choudhury | ............... | H04L 45/42 |
| 9,749,774 B2* | 8/2017 | Hargrave | ............... | H04W 76/10 |
| 9,986,411 B1* | 5/2018 | Stamatakis | ............... | H04W 8/005 |
| 10,142,122 B1* | 11/2018 | Hill | ............... | H04L 12/2807 |
| 10,243,802 B2* | 3/2019 | Erdmann | ............... | H04W 8/005 |
| 2008/0068156 A1* | 3/2008 | Shimokawa | ............... | H04W 84/18 340/539.22 |
| 2016/0139752 A1* | 5/2016 | Shim | ............... | G06F 3/0483 715/771 |
| 2016/0283443 A1* | 9/2016 | Michalscheck | ............... | G05B 19/406 |
| 2016/0285872 A1* | 9/2016 | Polar | ............... | H04L 51/36 |
| 2017/0005860 A1* | 1/2017 | Tan | ............... | H04W 84/20 |
| 2017/0214542 A1* | 7/2017 | Erdmann | ............... | H04W 24/02 |

OTHER PUBLICATIONS

Zigbee Alliance: "ZigBee Light Link Standard", Zigbee Document 11-0037-10, No. Version 1.0, Apr. 5, 2012 (Apr. 5, 2012), pp. 1-107, XP002720584, Retrieved from the Internet: URL:https:;//www.zigbee.org/Standards/ZigBeeLightLink/Download.aspx [retrieved on Feb. 17, 2014].

Colin Faulkner: "Secure commissioning for ZigBee home automation using NFC", Jan. 23, 2015 (Jan. 23, 2015), XP055358008, Retrieved from the Internet: URL:http://www.edn.com/Pdf/ViewPdf?content ItemId=4438456 [retrieved on Mar. 23, 2017], pp. 1-3.

* cited by examiner

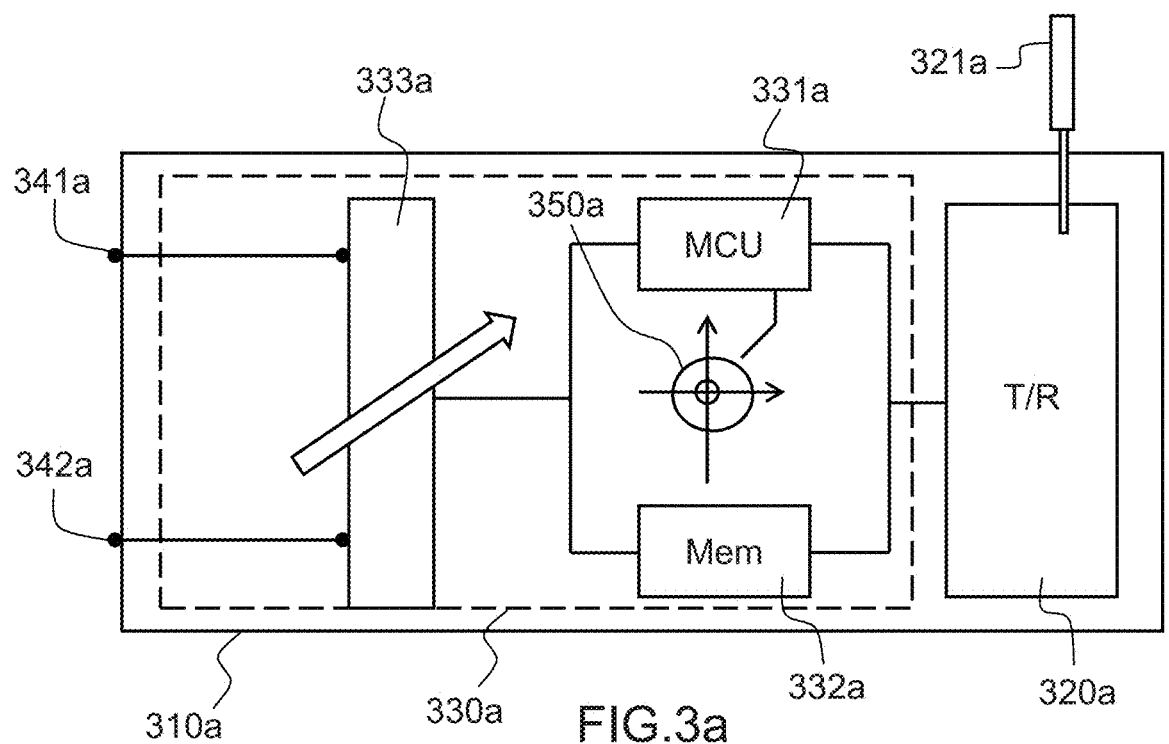
FIG.3a
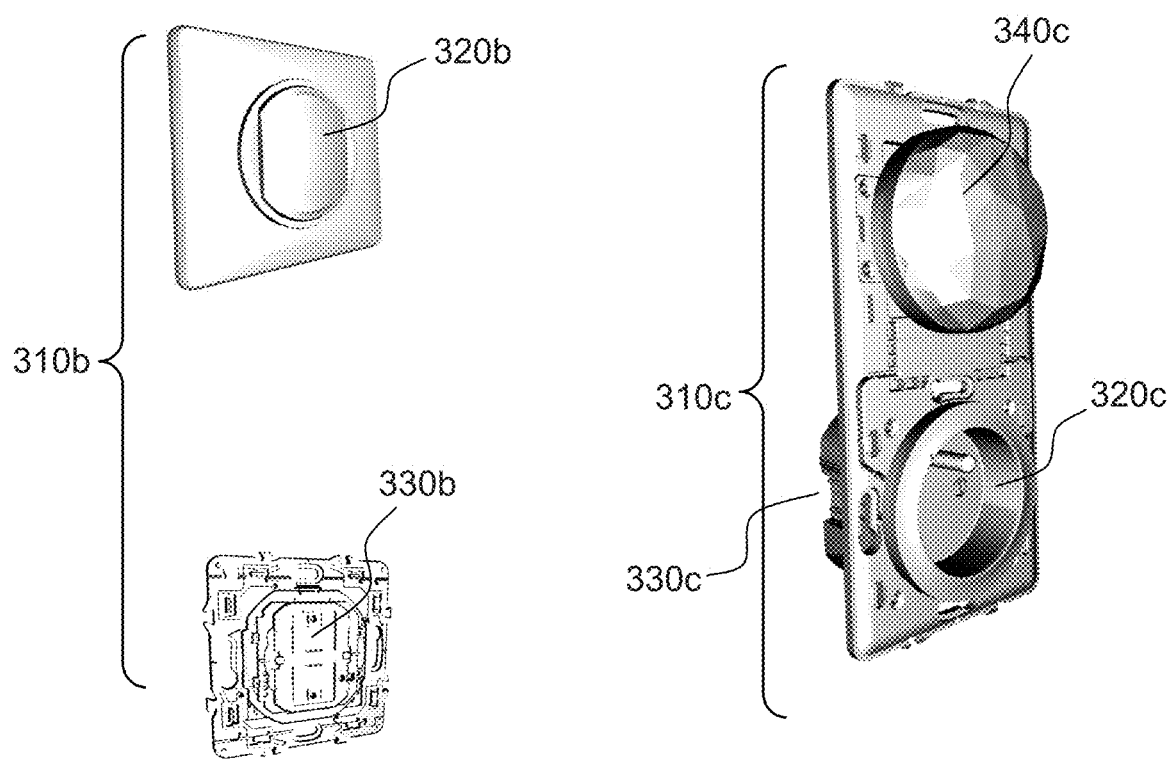
FIG.3b
FIG.3c

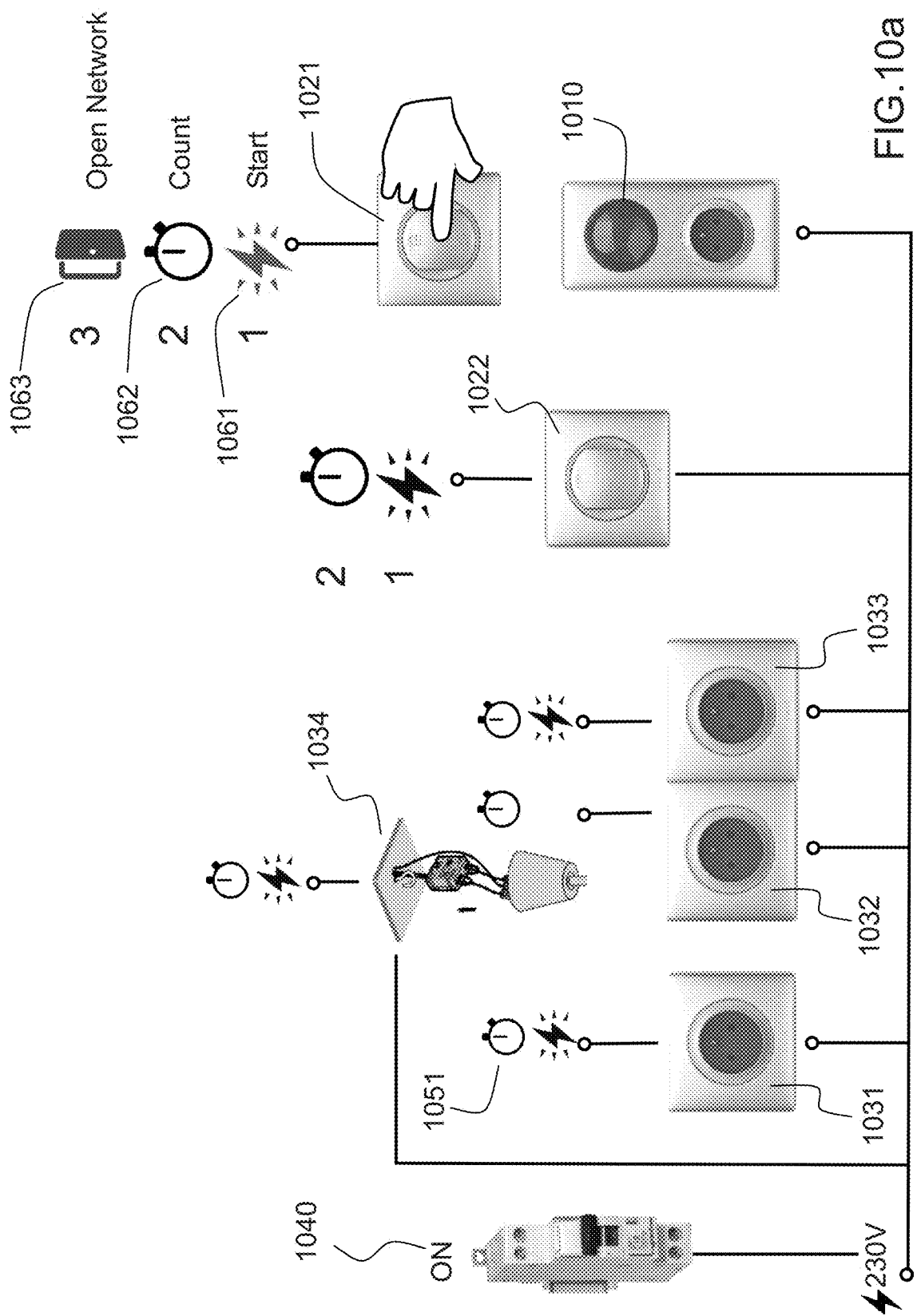

COMMISSIONING AND PERSONALIZING DEVICES IN A LOCAL AREA NETWORK

FIELD OF THE INVENTION

The invention relates to a local area network (LAN). More specifically, according to the invention, controlled and controlling devices are seamlessly attached to a network, paired together and personalized.

BACKGROUND

A home environment has more and more devices that may be controlled electrically. This is the case of lamps, heating and cooling equipment, windows, shutters or blinders, cooking and food preservation equipment, cleaning devices, entertainment devices, security systems, etc. These devices may be controlled from one or more remote controls, either in Line of Sight (LOS) of the device to be controlled, or from another room. Different types of remote controls may be used: optical (visible or Infrared) for LOS control, radiofrequency (RF) also for LOS, with the caveat that some non-LOS communications are also possible depending on the configuration of the home.

It is advantageous to establish a network in the home, for instance an RF network, to be able to share data between various devices having a same function, in a coordinate manner, i.e. setting the temperature control points of a central heater and of individual heaters connected to the central heater. The RF network may comply with the Wi-Fi, the Bluetooth™ or the Zigbee standard (IEEE 802.15.4). The Zigbee standard is advantageous for this type of applications because of its power saving capabilities. A power line network may also be used in lieu of an RF network, that authorizes non-LOS communications but is delicate to install, notably in old buildings.

Also, the devices installed in the home and connected to a network may be controlled from outside the home, using for instance an internet connection to a home or room gateway. The devices may then be monitored and controlled from anywhere in the world using an application running on a desktop, a laptop, a tablet or a smart phone or the like.

Similar problems and solutions arise in office and industrial or commercial buildings, with equipment that may be very costly and that will generally be monitored centrally by a facilities management system.

In all cases, it is necessary to commission the network and its nodes at the time of installation and to create associations between the nodes that will exchange information in operation. In Zigbee terminology, the first operation is called "Joining" and the second operation is called "Binding". This terminology will be adhered to in the rest of this description, although the invention may also apply to other types of networks or radio standards.

The first and second operations (together the "Commissioning" of the network) are generally performed by construction workers at the time of building or renovating the construction where the network is installed.

These two operations may be very tedious, notably because it is important to retain the privacy of the network, and this would normally require encryption keys authentication and/or physical actions on the devices, at the time of joining and binding each node.

A third operation is performed later by the user, or someone tasked to configure the network once installed, when he or she wants to personalize the controls by mapping an application running on one of its personal computing/communication devices to the topology and functionalities of the network that has been installed in his or her home. We will call this operation "Personalizing". Without this step, the network will be quite difficult to use by a standard user.

The three operations will be jointly designated under the expression "Initializing", that encompasses joining, binding and personalizing.

It is clear from the above paragraphs of the descriptions that there is a need for devices that allow a more seamless initializing of an RF network in a building. This will increase the efficiency of construction workers at the time of installing the network and the user experience and the time of personalizing the installed network.

SUMMARY OF THE INVENTION

A purpose of the present invention is to meet this need. To this effect, the invention discloses notably a first device adapted to control any kind of electric gear and a second device configured to join and bind to the first device and to one of obtain or pass automatically from/to the said first device an information representative of the set of commands to be used by the second device to command the first device.

More precisely, this invention discloses a first device comprising: a communication link to an RF network; a processor; a memory storing a table of data representative of a plurality of states of the first device or values measured or received at the first device; the processor being configured to: cause a joining of the first device to the RF network on one of a first predefined event or a single predefined event; cause a binding of a second device to the first device on one of a second predefined event or the single predefined event.

Advantageously, the binding causes an initialization of a table of commands to be exchanged between the second device and the first device, said table of commands matching at least part of the table of data.

Advantageously, the initialization results from a copy to/from the memory of the first device from/to a memory of the second device of at least part to the table of data.

Advantageously, the first device of the invention further comprises one or more sensors, wherein some of the data in the memory of the first device characterize an output of the one of more sensors.

Advantageously, the table of commands comprises one or more of change state commands or send sensor output commands.

Advantageously, the processor is further configured to cause a sensor whose output is listed in the table of data of the first device to send an output to the second device when a corresponding receive input data is present in a table of data of the second device.

Advantageously, the one of a first predefined event or a single predefined event comprises a validation of a joining request from the first device received at a network node, the joining request being transmitted by an electromagnetic signal.

Advantageously, the first device of the invention further comprises a connection to a power line.

Advantageously, the one of a first predefined event or a single predefined event is a validation of a joining request from the first device received at a network node before a predefined time has elapsed after activation of a connection of the first device to the power line.

Advantageously, the one of a second predefined event or a single predefined event comprises one of a shock, a physical contact, a physical proximity, a change of position or a match of position of the second device relative to the first device.

Advantageously, the one of a second predefined event or a single predefined event comprises an electromagnetic signal transmitted by the second device to the first device.

Advantageously, the electromagnetic signal is one of an optical signal, an RFID signal or a NFC signal.

Advantageously, the network comprises a gateway.

Advantageously, the processor is further configured to exchange one or more personalizing information with a user device through the gateway.

Advantageously, the one or more personalizing information comprise one or more of assigning a location, a type or a program to execute to the first device.

Advantageously, the first device of the invention is further configured to send data captured at one or more of the first device or the second device to the user device through the gateway.

The invention also discloses an equipment having a first device attached thereto, the equipment selected in a group comprising plugs, switches, lamps, heating gear, cooling gear, actionable windows, actionable shutters, actionable blinders, cooking equipment, food preservation equipment, cleaning devices, entertainment devices, security systems.

The invention also discloses a gateway for an RF network, the gateway comprising: an RF communication link to one or more first devices or second devices, the one or more first devices each comprising a table of data representative of a plurality of states of the said first device or values measured or received at the first device; a communication link to a user device; a connection to a power line; a processor; a memory; the processor being configured to: cause a joining of the one or more first devices to the RF network on one of a first predefined event or a single predefined event; cause a binding of at least one of the one or more second devices to a first device amongst the one or more first devices on one of a second predefined event or the single predefined event.

The invention also discloses a user device comprising: a communication link to a gateway of an RF network; a software application configured to transmit/receive data through the gateway to one or more first devices connected to the RF network; wherein at least part of the one or more first devices are each bound to one or more second devices, the second devices configured to send one or more change state commands or send sensor output commands to the first devices and the software application comprises a graphical user interface and computer code instructions to allow a user to declare a location and a type of the one or more first devices and to send commands to the first devices that will substitute commands received from the second devices.

Among other advantages, the invention provides an easy joining procedure for the device control units.

Also, joining and binding of the second device are performed at the same time, thus saving significant time to the construction workers tasked with the work package of the installation of a building.

The user is then capable of personalizing his/her home or office setting room by room, equipment by equipment using a simple app on his/her smart phone/tablet/laptop. He/she will then be able to send commands to all equipments from a dashboard, to program default command programs, to monitor the status of the equipment, to receive measurements/data/images/sounds captured by sensors connected to the equipments, trigger maintenance operations, etc.

In some embodiments of the invention, it is possible to use clusters of commands not provisioned in the prior art.

BRIEF DESCRIPTION OF THE DRAWINGS

The invention and its advantages will be better understood upon reading the following detailed description of a particular embodiment, given purely by way of non-limiting example, this description being made with reference to the accompanying drawings in which:

FIGS. 3a, 3b and 3c respectively represent a schematic of a smart plug, a photograph of a remote control and a photograph of a smart plug comprising a gateway according to the invention in a number of its embodiments;

FIGS. 10a and 10b display successive steps of an exemplary joining procedure for network devices in some embodiments of the invention;

DETAILED DESCRIPTION

Figure 1:
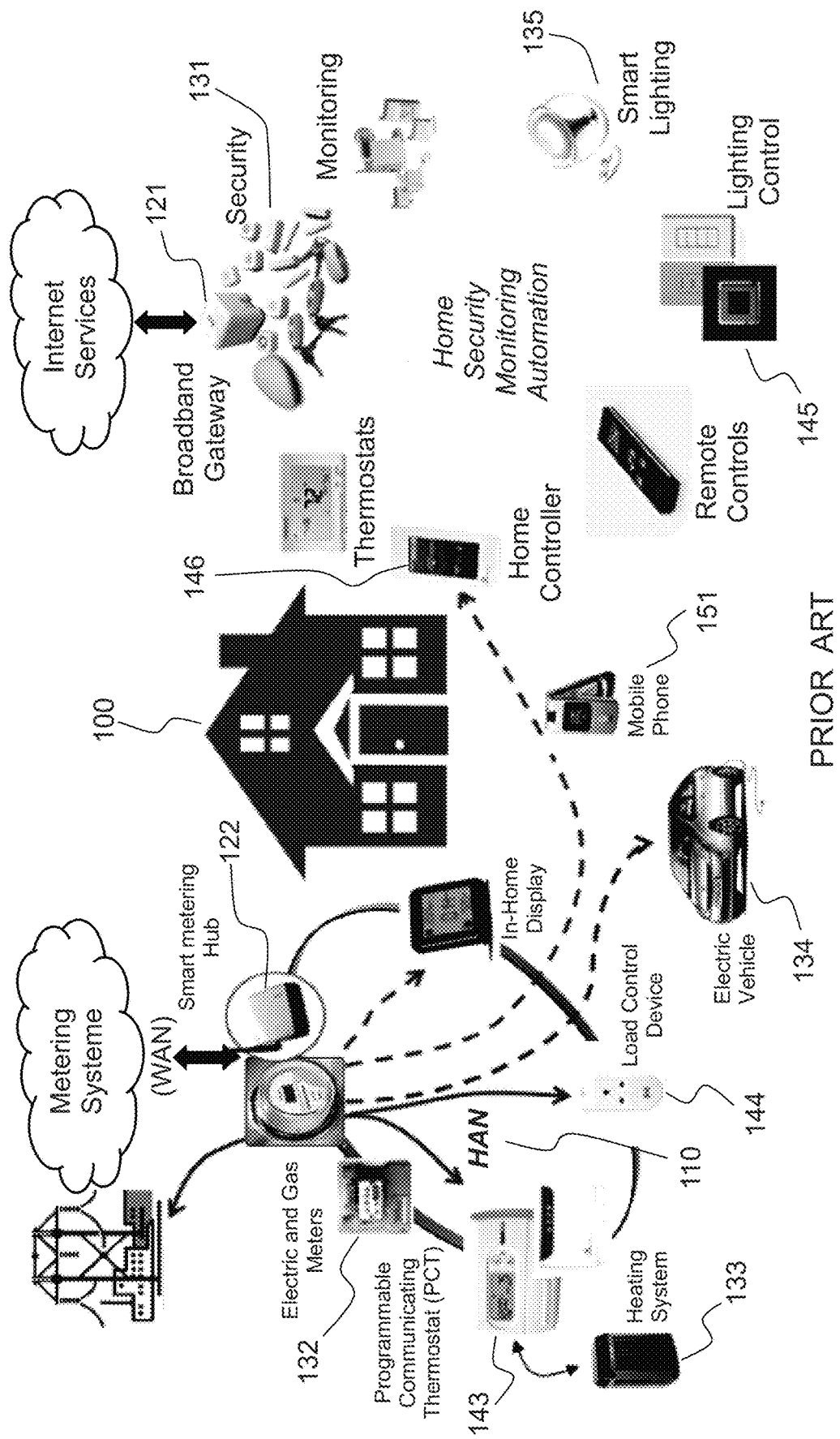
FIG. 1 represents a number of devices with applications in a smart home environment that may be enabled by the invention, in a number of its embodiments.

FIG. 1 represents a number of devices with applications in a smart home environment that may be enabled by the invention, in a number of its embodiments.

The description of the different systems illustrated on FIG. 1 will allow a better understanding of the use cases of the instant invention. Nevertheless, these use cases should not be construed as limitative but only illustrative of the field of application of the invention.

The smart building 100 represented on the figure has one or more Local Area Networks or Home Area Networks (LAN or HAN, 110). LANs may use various types of transmission layers: Ethernet cable, optical fiber, Power Line Carrier (PLC), wireless transmission. Different protocols may be used. In the case of a wireless transmission media, Wi-Fi or Zigbee are among the most popular. It is likely that 5G will also be used for HAN when it will become available. Zigbee HANs will be described in relation to FIG. 2.

In a building, there may be a single LAN or a plurality of LANs. The option may depend on the obligation to use more than one gateway to communicate to the outside world. For instance, there may be a first gateway 121 to access Internet services and there may be a second gateway 122 to access metering systems 132. This segregation may be imposed by the utility companies (electricity, gas, water, etc. . . . ) managing the smart metering systems because they use proprietary communication means that need to be separate from the other HANs. But in other use cases where the metering is performed through internet applications, it is possible to have the smart meters share in the same single HAN.

But there may be other reasons to opt for segregated HANs: it may be more efficient to allocate dedicated networks to specific applications. Some exemplary applications are illustrated on FIG. 1, but of course other applications may be envisaged.

A security monitoring application 131 may be deployed in and/or around the building 100. It may consist of a number of sensors such as: visible light or IR cameras; radars or LIDARS; sound detectors, presence sensors, proximity sensors, etc. . . . Some sensors may be located inside the building. Other sensors may be located outside the building. The sensors may capture data systematically or selectively. Selectivity may be made contingent on predefined types of objects or events being detected. Sensor data may be monitored locally or remotely. Monitoring may trigger alarms, also locally or remotely. Alarms may be acoustic signals, optical signals, or in the form of a message to a remote response center that will send security staff on-site.

The Heating system 133 of the building 100 may be a programmable heating system controllable locally by a Programmable Communicating Thermostat (PCT, 143). The PCT may have one or more temperature setpoints. The temperature setpoints may be entered manually in the PCT. A plurality of temperature setpoints may be programmed locally on the PCT based on a daily timeline (early night/mid night/late night/early morning/midday/late day temperature setpoints, by way of non limitative examples). The PCT being connected to a HAN, it may also be programmed remotely, for instance using an application installed on and/or accessible from a mobile phone 151. In some embodiments of a Heating system, Thermostatic Radiating Valves may be installed on some or all of the radiators of the Heating system and their temperature setpoints may also be controlled either locally or remotely. Also, a refrigerating equipment may be controlled locally or remotely in a way that is similar to the way a Heating system is controlled.

An electric vehicle 134 may be reloaded using a Vehicle Charging Device (VCD) in a garage of the building 100. The VCD may be controlled locally using a Load Control Device 144. The load dispensed by the VCD may also be controlled remotely using an application.

A Smart Lighting System (SLS, 135) may be also installed in the building 100. A SLS may consist of a number of smart light bulbs or of a number of smart plugs where lamps may be plugged. The smart light bulbs and smart plugs are equipped with control boards or Systems On Chip (SOC). A lighting control 145 will then allow controlling the current in the smart light bulb or plug to be switched from the OFF state to the ON state and vice versa or to be varied to reduce/increase the brightness of the light. There may be one remote control per room. In some instances, a remote control may be combined with another switch to form a two-way switch. But there may be also a plurality of lighting controls in a room or a central lighting control from where a number of rooms may be controlled. It is to be noted that equipments that are not lamps may be plugged in a smart plug, such as an electric heating equipment, an electric cooking equipment, or any other kind of electric equipment whose functioning can be commanded both in a binary manner or in a continuous manner.

Other types of systems, not displayed on the figure, may also be included in a HAN. For instance, blinders/shutters may be equipped with electric motors and controlled and actuated either locally (room by room or centrally) or remotely. TV sets may be equipped to be programmable remotely, for instance to record programs for later playback. A number of sensors may be placed inside or outside the building to monitor the temperature, the quality of ambient air, the intensity of wind, the humidity, the amount of rain, etc. The measurements of the sensors may be sent to a server of a service provider for processing, consolidation and redistribution to the service subscribers. The measurements may also be sent only to the owner or tenant of the building, partially (privacy issues) or in total.

The controllers of the various smart control applications or subsystems running in the building 100 may be centralized at a central home controller 146. From the central home controller, it may be possible to control all applications, or only some of them. In some embodiments, the central home controller may be accessible remotely. Also, the central home controller 146 may be equipped with a screen to display the different components of the subsystems, data, images or graphics gathered by sensors of the subsystems, setpoints, alarms, parameters, etc. In some embodiments, the screen may be a tactile surface or another input device specially adapted to the user or the application.

According to the invention, some or all of the devices or equipments of the different subsystems 131, 132, 133, 134, 135 are connected to a LAN/HAN that is an RF network. Other subsystems not displayed on the figure may also be connected to the HAN. Also, the controlling devices, 143, 144, 145 of some of the subsystems, and of subsystems not displayed on the figure should be connected to the HAN in a manner now commented upon in relation to FIG. 2.

Figure 2:
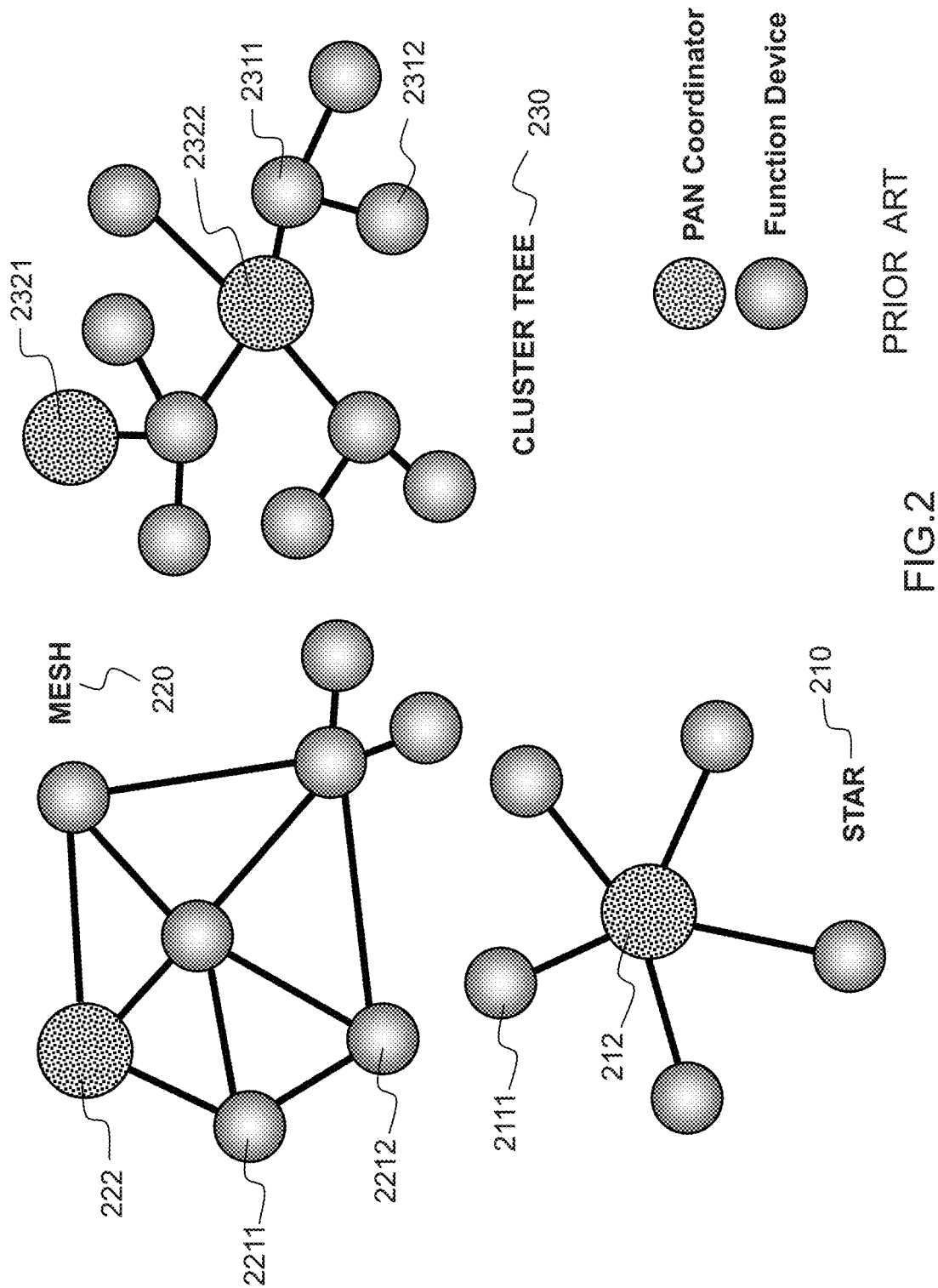
FIG. 2 represents a topology of a Zigbee™ network with which the invention may be implemented, in a number of its embodiments.

FIG. 2 represents a topology of a Zigbee™ network with which the invention may be implemented, in a number of its embodiments.

In some embodiments of the invention, the LAN/HAN is a Zigbee network. This does not mean that the invention cannot be used with other HANs or LANs (also sometimes called Personal Area Networks or PANs). For instance, the invention may also be used with a Wi-Fi network.

Zigbee networks are the subject of a specification developed by the Zigbee alliance that comprises a number of device manufacturers. The Zigbee network specification is an I3E standard (I3E 802.15.4). It is applicable to Wireless Personal Area Networks (WPANs). It encompasses short-range Line of Sight (LOS, 1-10 m), low-power devices. Zigbee networks are well suited for communicating devices at intermittent, low data rate that need to have a long battery life and a secure communication protocol. Zigbee communications use a 20 to 250 kb/s data rate and an encryption 128-bits symmetric key.

The RF frequencies used for the Zigbee communications are some of the Industrial Scientific and Medical (ISM) frequency bands that have the advantage of being loosely regulated. The 2.4 GHz frequency band is available for these applications in most jurisdictions. Alternatively or in addition, the 784 MHz band is available in China, the 868 MHz band is available in Europe and the 915 MHz band is available in the USA and Australia.

The objects connected to the network are designated as Zigbee Device Objects (ZDOs). They may be sensors, actuators, input devices or any type of devices that may be controlled or actuated, such as the ZDOs of the invention.

ZDOs will then comprise a device control unit or Smart Electric Controller (or SEC) comprising a Zigbee transmit/receive (T/R) unit comprising or associated with a number of circuits like a processor, a memory, a power control circuit connected on a bus. The SEC may be embodied in an electronic board or in a System On Chip (SOC) circuit. Examples of such SOCs (including or not additional circuitry of the type mentioned above) comprise:

The MRF24J40 from Microchip™;
The CC2650 from Texas Instruments™;
The EM358x and EFR32MGxxxxx from SiliconLabs™;
The ATSAMR21 from MICROCHIP™.

Other devices may of course be used without departing from the scope of the invention and it is likely that, with the advancement of communication technologies and devices, other devices and standards may surface in the future.

Typically, three architectures of a PAN/Zigbee network may be envisaged: a tree architecture 210, where all ZDOs 2111, 2112 communicate only with a PAN coordinator 212; a mesh architecture 220, where all ZDOs 2211,2212 communicate with a PAN coordinator 222, either directly or indirectly, as well as with the other ZDOs of the network 2212, 2211; a cluster tree architecture 230, that may have more than one PAN coordinator 2321, 2322, to and from which the ZDOs 2311, 2312 may communicate as well as to and from other ZDOs, 2312, 2311.

In the mesh architecture and in the cluster tree architecture, the communication range may be extended by device-to-device relay of messages, possibly in non-LOS.

The PAN/Zigbee coordinator 212, 222, 2321, 2322 is a specific network node that is configured to maintain/control a list of the addresses/identifiers of the network nodes. The PAN/Zigbee coordinator may be coupled to a gateway to another PAN, another LAN, a WAN or to Internet services to provide extended communication capabilities, symmetric or one-way only.

The Zigbee protocol layer supports two types of services:
The cluster services (ex key-value pair service or KVP) is meant for configuration purposes; it enables description, request and modification of object attribute through a simple interface based on getting/set and event primitives, some allowing a request for a response; configuration uses compressed or full XML;
The Message service is designed to offer a general approach to information treatment, avoiding the necessity to adapt application protocols and potential overhead incurred on by KVP. It allows arbitrary payloads to be transmitted over APS (APplication Sublayer) frames.

One of the problems to be solved in Zigbee networks is to commission the network in the most seamless and quick manner as possible without compromising the security of the network. Commissioning includes joining, i.e. allowing nodes/ZDOs to become member of the network and binding, i.e. pairing nodes/ZDOs.

In a standard Zigbee joining protocol, the person tasked with commissioning the ZDOs will have to initialize the joining one device after another and this will be tedious. Also, in the prior art, binding will be generally performed by two concomitant button presses on the ZDOs to be associated and this will take time and will possibly be subject to failures.

Thus, a less tedious, more automatic and quick manner to perform the commissioning of a Zigbee network is needed. This is especially advantageous in the use case of a Zigbee HAN where a large number of devices have to be bound, like for example for a SLS where there is a large number of remote controls that need to be joined to the network and bound to smart lights or plugs.

The invention fulfills these needs and others as explained below.

FIGS. 3a, 3b and 3c respectively represent a schematic of a smart electric controller, a photograph of a remote control and a photograph of a smart plug comprising a gateway according to the invention in a number of its embodiments.

The SEC 310a of FIG. 3a comprises an IN connection from a power line 341a and an OUT connection to a power line. The power line is generally an AC power line. The IN and OUT connections may be located on a standard female or male plug. The SEC may itself be powered by a battery or connected to the power line through a converter.

The SEC 310a comprises a communication link 320a that may be a Zigbee T/R module of the type described above (discrete components or SOCs). The T/R module has an antenna 321a. The SEC further comprises a control circuit 330a that is configured to change the state of the connection of the plug to the power line from an OFF to an ON state or vice versa based on change state commands received by the T/R module from a remote control. The control circuit comprises a switching component 333a that may be an electromechanical or electromagnetic component or an electronic component such as a Zener diode or a thyristor.

In a variant, the switching component may be replaced by a variable resistance or a varistor that can drive the intensity of the current in the smart plug continuously from a 0% of power state to a 100% of power state. In a further variant, the variable resistance may be adjustable not continuously but between a number of discrete states (by way of example, possible values are only: 0%, 25%, 50%, 75%, 100%). A variable resistance with two states 0%, 100% is equivalent to a switching component. In some variants, the control circuit may comprise the hardware component that is capable of performing continuous adjustment, discrete adjustment and ON/OFF switch. The configuration of the control circuit may then be changed by a software parameterization or update of switches or data in a table, etc. . . .

In a number or variants of the invention not illustrated on the figure, the control circuit 330a may also be located inside an electric appliance instead of being located in a female plug or a male plug.

A large variety of electric appliances may be controlled using the smart electric controller described above. The switching component or the variable resistance will be controlled directly by a microcontroller with a memory with microcode containing a control logic. To this effect, the control circuit may further comprise a microcontroller (MCU) 331a and a memory 332a or, alternatively, the microcontroller and/or the memory of the T/R module may be used.

In some embodiments, the control logic may be more complex than the logic that is needed to change the intensity of current. It may comprise logic to program predefined times with intensity of current setpoints that will vary the intensity of lighting at various periods within the day.

It may also comprise control logic that may be used to select a program to run on the electric appliance, such as controlling temperature setpoints of a TVR, controlling the load of a rechargeable electric or hybrid vehicle, closing/opening a blinder/shutter, executing a washing program in a washing machine or a cooking program in a cooking equipment like an oven.

Optionally, the smart electric controller may be configured to collect data from sensors embedded in the electric appliance that is connected thereto. For instance, a gas sensor in a refrigerator may detect stored aliments that are passed their limit consumption date. A gas sensor in an oven may report a cooking temperature that is excessive. Reporting data may trigger a local alarm. It may alternatively be sent to a server or a user terminal. It may also be stored in the memory of the smart electric controller for further exploitation.

In a variant, an accelerometer 350a may be included on the SEC board 310a to detect a shock or "taptap" on the SEC. The accelerometer may be a single axis accelerometer or may be an accelerometer comprising a plurality of axes. Detection of shock may be used in the binding procedure with another device or in the personalizing procedure, as discussed further below in the description. In a variant, the accelerometer to detect the shock may be located in the remote control (RC) and not in the SEC. Also, an accelerometer may be provisioned both in the SEC and in the RC. In a variant, the accelerometer 350a may be replaced by a proximity sensor. A proximity sensor may be formed by a half-capacitor. In such an embodiment, each one of the devices comprises a half-capacitor. When the two half-capacitors are brought at a distance that is lower than a threshold, the two sensors detect one another and the binding may be performed. A proximity sensor may also be formed by an RF transponder. One of the devices sends a signal to the other device that answers back. A measurement of the time to receive the answer (Time of Flight) (TOF) gives an indication of the distance between the two devices. When this distance is lower than a preset threshold, the binding may take place.

In another variant, in lieu of or in addition to an accelerometer, the SEC may comprise an additional passive or active T/R module of electromagnetic radiations to perform binding with another device as will be explained below in relation to the remote control of FIG. 3b. In this family of variants, binding will only be possible with the RCs having similar additional T/Rs.

When the SEC has joined the Zigbee network, it is a ZDO, either alone when in the form of a plug as displayed on FIG. 3a, or in combination with the electric appliance that it is adapted to control. Joining is a part of commissioning of a Zigbee network that is necessary to have the ZDOs functions activated. Joining according to the invention will be described further below, notably in relation to FIG. 6.

FIG. 3b is a snapshot of a remote control configured to control the smart electric controller of FIG. 3a.

The remote control (RC, 310b) comprises a Zigbee T/R unit 320b that is similar in structure to the T/R unit 320a of the SEC. It also comprises an input unit 330b to enter commands to be sent by the Zigbee T/R module of the control circuit to one or more ZDOs. The input device 330b may be a simple ON/OFF button, a rotatable button or a button with a number of discrete positions. It may comprise a plurality of buttons. It may also be a touch screen or panel that will allow a display of the set of commands that are available for a specific appliance. In all embodiments, the input device 320b will comprise circuitry (not shown on the figure) and control logic to convert the commands entered in the input unit into digital signals to be sent to the SEC to which the RC is bound.

The controls input in the remote control will only be operative to control the smart electric controller of FIG. 3a when the remote control has also joined the Zigbee network and has been bound to the said smart electric controller.

In some embodiments, a motion sensor such as a single axis accelerometer or an accelerometer (not shown on the figure) with a plurality of axes may be included in the remote control to detect a "taptap" between the remote control and a smart electric controller to which the remote control should be paired. The accelerometer may be replaced by a proximity sensor. Such taptap will be performed by a person in charge of commissioning the devices to the network. Alternatively, the accelerometer or proximity sensor may be provisioned in the SEC. Or the two devices may comprise an accelerometer.

Alternatively, the RC 310b may include an Infrared Light emitter, a visible light emitter or an RFID or NFC tag (not shown on the figure). Then, the binding may be triggered by an exchange of electromagnetic signals using these transmission media. Binding will only be possible with SECs having the same features.

In some advantageous embodiments, the joining and the binding of the remote control may be performed simultaneously.

It is to be noted that a remote control may be bound to more than one smart electric controller. Conversely, more than one remote control may be bound to one smart electric controller. For instance, a smart electric controller that is located in a room may coexist with a smart electric controller that is common to all rooms and electric appliances in the building.

The remote control may be fixed to a wall of a room where a number of electric appliances to be controlled are located. It may be located in one of the rooms of the building and be configured to control all the electric appliances of the building. It may be a portable device that can be transported by a user. It may also be a combination of the two configurations, i.e. a portable device that can be set to rest in a specific lodging, located for instance on a wall of a room.

In an embodiment where the electric appliances to be controlled are, for instance, lamps in a room, the remote control will be configured to control all the lights in the room at the same time, i.e. all the lamps in the room will be OFF or ON at the same time or they will have the same luminance at the same time. In other embodiments, the remote control may be configured to control only one of the electric appliances at the same time. For instance, if the remote control is bound to all smart electric controllers in a room, the appliance to be controlled at a moment in time may be selected by an ID number or by a name (Bedside right lamp, Bedside left lamp, TV set, radio, etc. . . . ).

The microcontroller and the memory of control circuit 330b of the remote control (either those of the Zigbee device or specific circuits added to the input unit) will comprise control logic that is used to send adequate commands to the designated smart electric controller.

In an embodiment of the invention, the commands stored in the memory of the RC will be mapped automatically to the commands expected by a definite smart electric controller that were initialized in the memory of the RC at the time of binding. Each time that the definite smart electric controller will then be commanded by the remote control, the adequate list of commands will be made available to the microcontroller of the remote control to be sent to the smart electric controller through the Zigbee T/R unit.

In some embodiments of the invention, a gateway between the Zigbee HAN and another network may be included in the Zigbee network. It may then have the structure displayed on FIG. 3c.

In some embodiments of the invention, the HAN may be a stand-alone network. But in other embodiments, the HAN will be connected to a WAN or to the Internet. Communications to a WAN or to the Internet may be mono-directional or bi-directional as discussed in relation with FIG. 1. Communication may be to transfer metering data to a hub of a utility company. It may be to send sensor data, such as temperature, light, wind or rain intensity, images from surveillance cameras, etc. . . . It may also be to receive TV or audio programs to be transferred to various TV displays or loudspeakers in the building.

The structure of the device 310c displayed on FIG. 3c is remarkable in that it does comprise, in addition to a female plug 320c and a combination of a T/R and control circuit 330c, a gateway circuit 340c. The T/R and control circuit 330c is similar in function and structure to the T/R and control circuit 320a, 330a. No additional comment will therefore be presented here in relation to these parts of the device.

In the example represented on FIG. 3c, the gateway circuit 340c is a Wi-Fi T/R unit. One should note that the structure of the device of FIG. 3c is well adapted to a plug to be inserted in a wall. Notably, the device may be placed in a standard plug hole, the gateway circuit being located on top of a planar structure above the other parts of the device. This notably reduces the cost and difficulty of equipping a building with smart home components.

In some embodiments, the gateway circuit 340c may comprise an Ethernet and/or a PLC controller in addition or as a substitute to the WiFi T/R unit.

Generally, the gateway should be the PAN/Zigbee coordinator and will have the functions of such a Zigbee node that were described in relation to FIG. 2 above.

Binding may be performed between a smart electric controller and a remote control so that the latter may send commands to the former. But it may also be performed between two or more smart electric controllers to pass parameters of one of them to the other(s). For instance, a TRV in a room may be bound to all other TRVs in the same room so that, when a temperature setpoint of one of the TRVs is changed, the change automatically applies to the other TRVs in the same room.

FIGS. 4a, 4b, 4c, 4d, 4e, 4f and 4g represent different screens of an application installed on a user device configured to control a number of devices in a smart home environment according to the invention in a number of its embodiments.

In some embodiments of the invention a user device may be used to personalize the settings of a HAN. The user device may be a desktop, a laptop, a tablet or a smart phone. An application made available by the provider of the smart electric controller equipments or by a third party will be installed on the user device. The HAN will comprise a gateway, such as the gateway 330c displayed on FIG. 3c, so that the user device may gain access to the devices that have joined the HAN.

The bindings of the remote controls will generally have to be performed before personalization. In some alternative embodiments, if the remote controls have already been joined to the HAN, the binding may be performed using a user terminal with an application that will comprise a binding option for the remote controls listed in a screen of the application.

Once the commissioning of the network has been performed, personalization will consist in associating the smart electric controllers with functional devices, so that the user will easily recognize them on his/her device before sending commands thereto.

A first step (FIG. 4a) of personalization may consist in creating the rooms of the building in the application. The creation will take place one room at a time, the user being present in the room at the time of creation.

Then a second step (not represented on the figures) will consist in designating physically the smart electric controllers in the room as well as the corresponding remote controls (or switches). The designation of a switch may be done by actuating it. The designation of a smart electric controller (plug or lamp or device) may be made by a manual taptap on the device Other means of designation of the smart electric controller are described further below in the description. Thus, the controllers are then detected and the user then sees the smart electric controllers appear on the screen of the user device in the adequate room. In some embodiments, the remote controls are not displayed on the user device.

The third step (not represented on the figures) consists in allocating a name of a type of an electric appliance in a room to a smart electric controller that has been associated with a room (Light, Light plug, Refrigerator, Oven, Washing machine, Drying machine, Dish washing machine, Multimedia centre, other . . . ). Other appliances may be added.

Figure 4B:
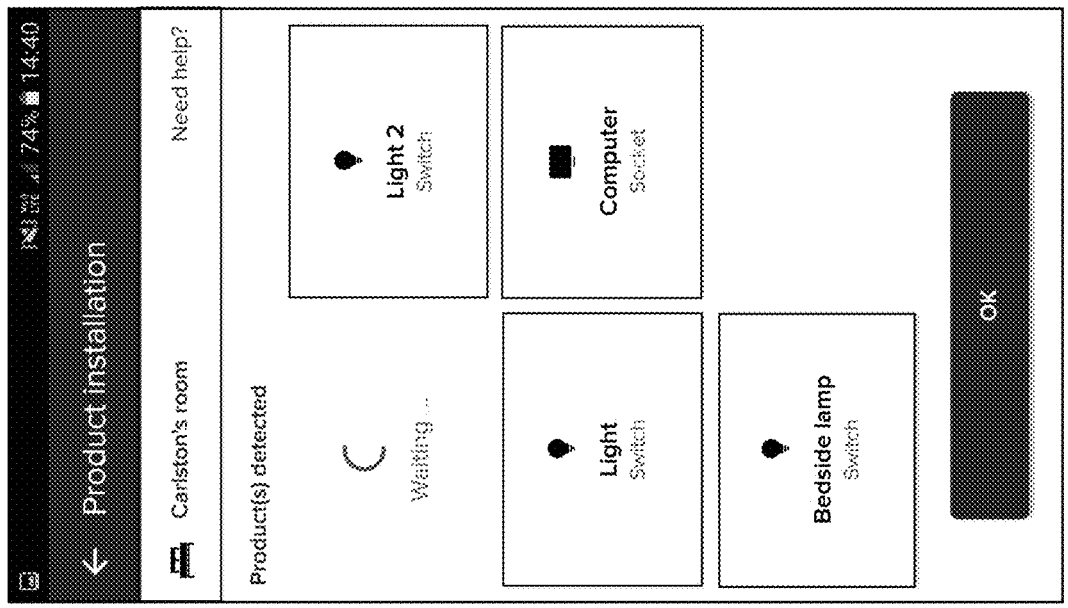
FIGS. 4a, 4b, 4c, and 4d represent different screens of an application installed on a user device configured to control a number of devices in a smart home environment according to the invention in a number of its embodiments.
Figure 4A:
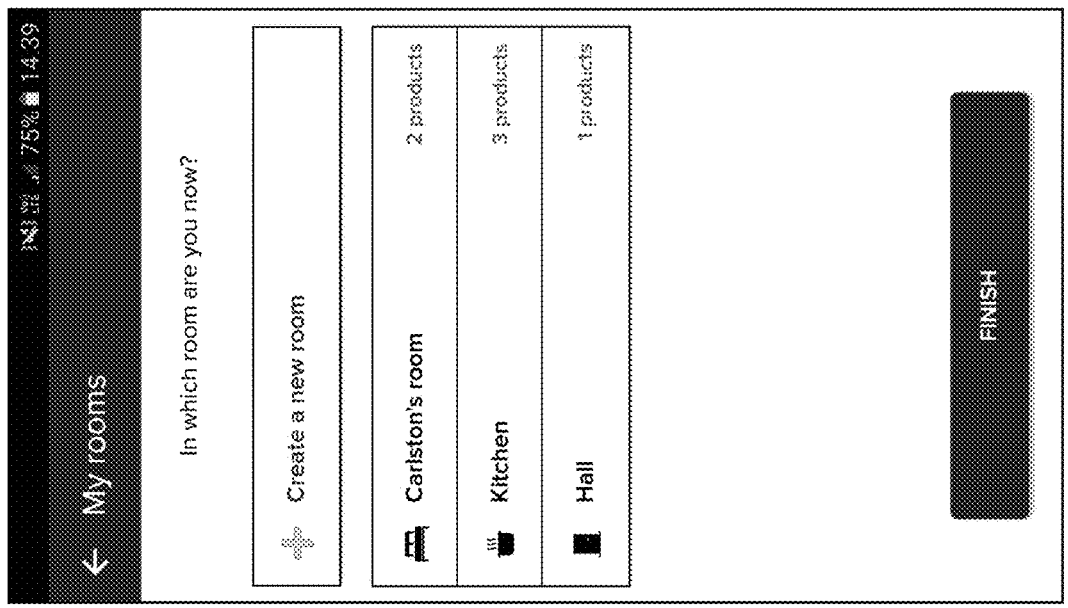
Figure 4D:
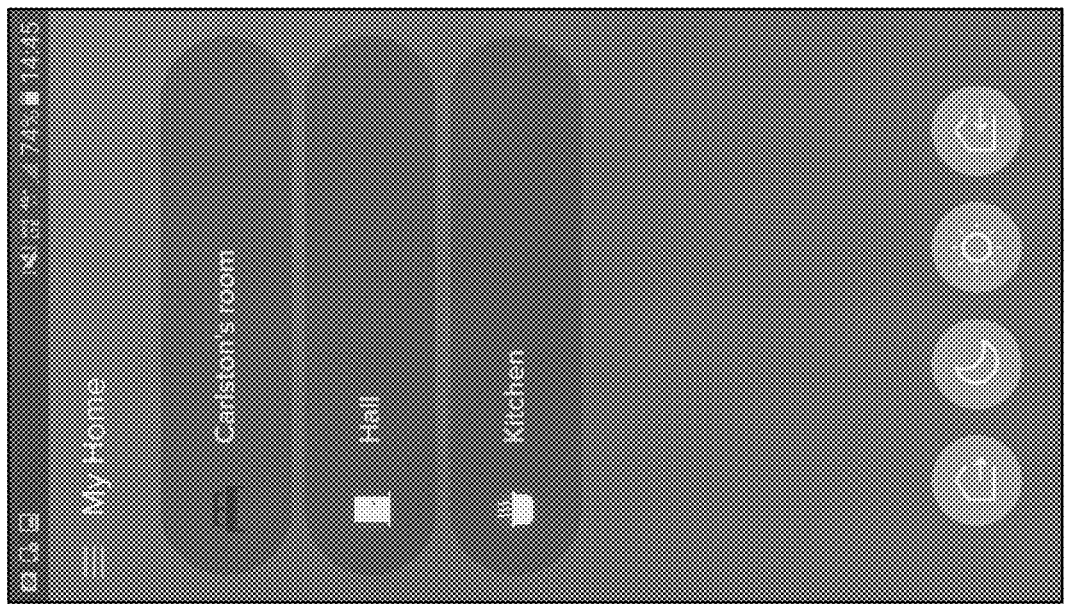

At a fourth step (FIG. 4b), a type in the nomenclature of FIG. 4d is allocated to the smart electric controller located in a definite room (in the case illustrated on the figure, the Carlston's bedroom).

Figure 4C:
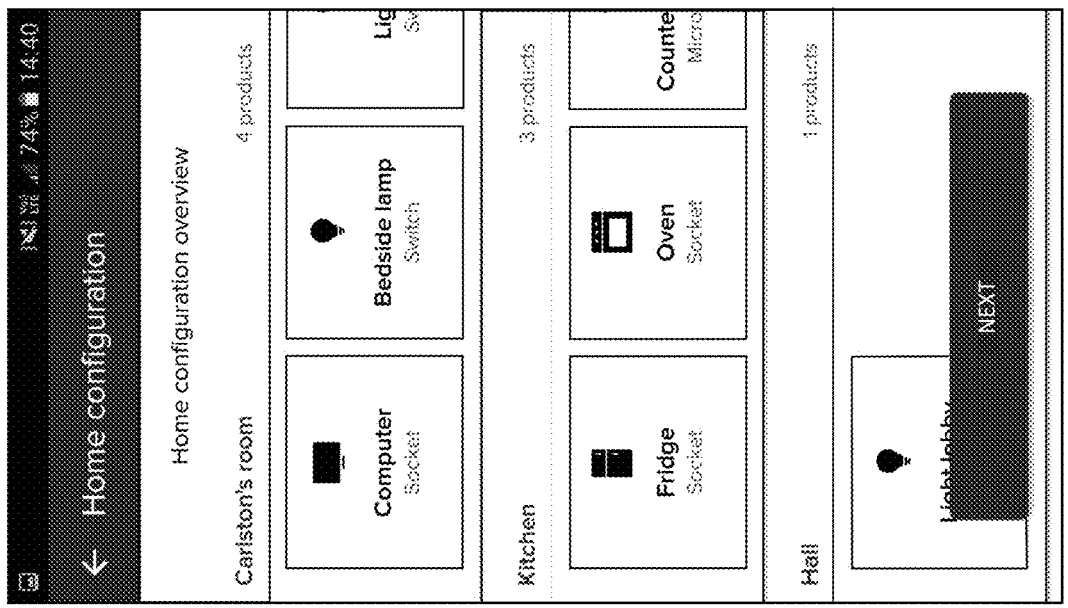

FIG. 4c displays the result of the personalization, with widgets that represent on a screen that is organized by room, the different appliances that have been installed.

The settings of the personalization may be changed from time to time, for instance when an appliance of a first type is replaced by an appliance of a second type.

FIG. 4d represents a dashboard of the various rooms in the building that will allow the user to send commands remotely to the individual smart electric controllers that have been allocated to each individual equipment in a room at the time of personalization. The dashboard will generally display the states of each individual appliance and may also display a number of measurements performed by sensors coupled to the appliance (e.g. room temperature; temperature of a refrigerator or freezer; temperature of an oven; temperature setpoint of a radiator; $CO_2$ concentration in a room; humidity rate in a room; washing or cooking program being executed and time since inception and/or time to completion, automatic programs planned, etc . . . ).

Figure 5:
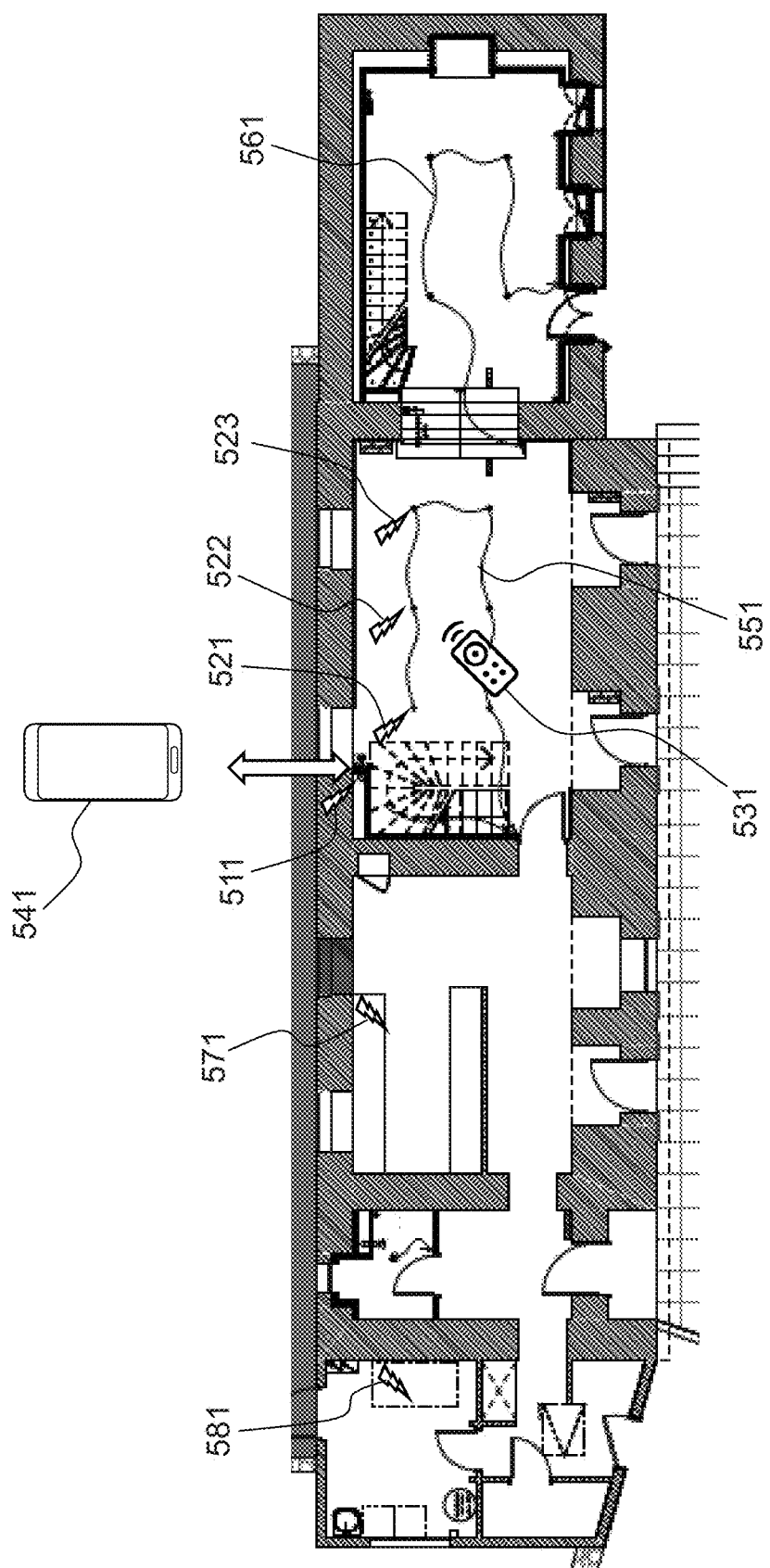
FIG. 5 displays an architecture of a network with the devices to implement the invention according to a number of its embodiments.

FIG. 5 displays an architecture of a network with the devices to implement the invention according to a number of its embodiments.

The figure displays a lay-out of a building that may be a country house equipped with a gateway 511 of the type displayed on FIG. 3c. The gateway allows communication with a user device 541 that the user may carry with him/her at work or at his/her main residence. The gateway may be a Wi-Fi gateway connected to a main gateway that may be a subscriber box. The subscriber box may be giving access to the Internet, through a fiber optic communication link or an ADSL connection. The local network may be a Zigbee HAN. The network nodes 521, 522, 523 are ZDOs/SECs comprising a Zigbee T/R unit and a control circuit. In the example of the figure, they are smart female plugs located on a power line 551. The network nodes are of the type displayed on FIG. 3a. Different devices may be plugged in the smart plugs and controlled by the remote control 531 (that is another ZDO), once the remote control has been bound to the other ZDOs. The remote control is a device of the type displayed on FIG. 3b.

Another Zigbee network 561 may be installed in another room, with basically the same functionalities (the nodes are not displayed on the figure). A discrete appliance 571 may be controlled in the kitchen, possibly with another remote control (not displayed). It may be capable of joining the network 551 through the node 511 which is also a gateway. The heater may also be a node 581, connected to the network 511, through the node 571, thanks to the mesh structure of the network.

Figure 6:
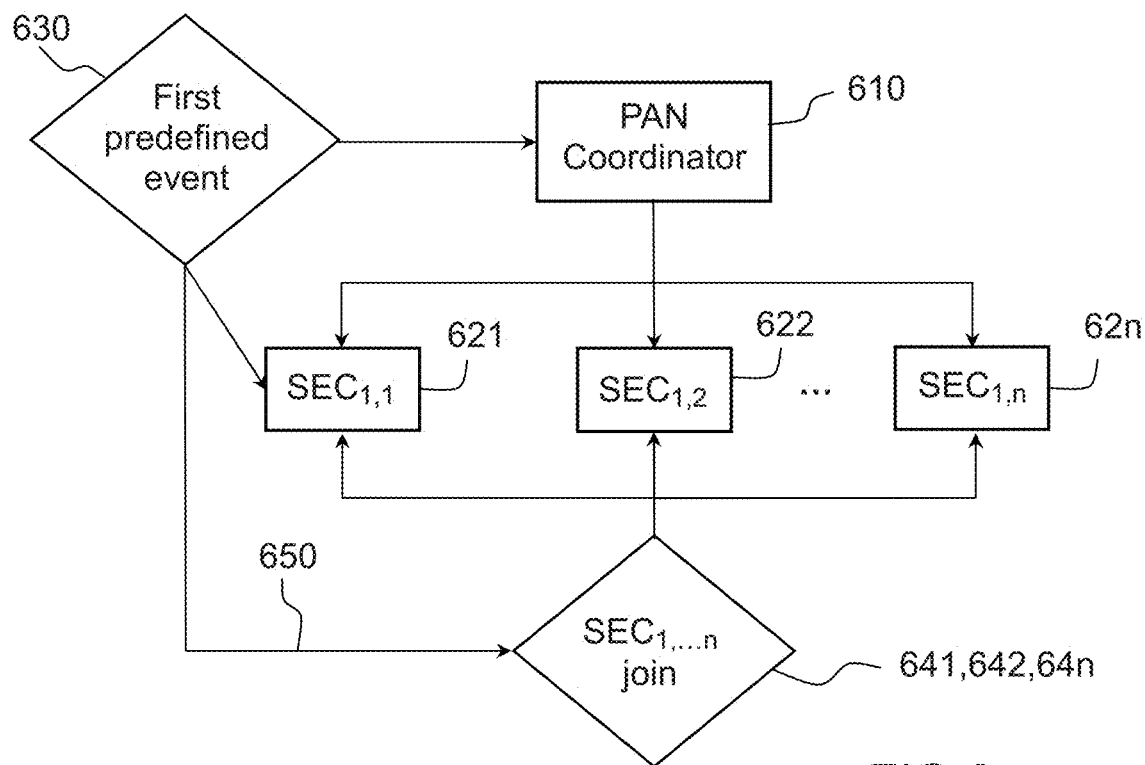
FIG. 6 displays a flow chart of a joining procedure of a smart electric controller according to the invention in a number of its embodiments.

FIG. 6 displays a flow chart of a joining procedure of a smart electric controller according to the invention in a number of its embodiments.

A PAN 610 coordinator is first attached to the network that is going to be commissioned according to the invention. Then, the Smart Electric Controllers (further designated as SECs or first devices) $SEC_{1,1}$, 621, $SEC_{1,2}$, 622, . . . , $SEC_{1,n}$, 62n, are successively attached to the network through a joining procedure. Each of the SECs may have the physical structure of the devices of FIG. 3a or may have a different physical structure and the same function (i.e. receiving control commands from a remote control and executing these commands by varying the state of a power line or having a definite program executed by an appliance). Joining all the nodes that need to be attached to the Zigbee HAN is the first step of commissioning the network. Joining may be performed to the PAN coordinator or to a node that has previously joined.

According to the invention, joining is triggered by a first predefined event 630.

In an embodiment, the first predefined event that is powering up simultaneously a first device that was not in the network and a second device already in the network, initiates a joining request sent by the first device to the second device. The joining may be declared successful if the powering times of the two devices are reasonably similar and that a validation is received by the second device already in the network. The validation can be for example an intentional press on a switch of the network to ensure that the network is not built without the consent of the user. In a number of variants, the joining request may comprise an input of an ID of the requesting node that will have to be validated by the receiving node.

In another embodiment, the first predefined event may be a validation by a network node of a joining request sent by the first device to a network node using a pair-to-pair communication protocol on an electromagnetic carrier signal. The electromagnetic signal carrying the request may be an infrared carrier, a visible light carrier, an RFID carrier or an NFC carrier. In an embodiment, the signal may have a waveform that is proprietary and is an identifier per se. It may also be an encrypted identifier that is carried by the signal and decrypted at the receiving node.

Joining is then declared successful for each individual node (641, 642, . . . , 64n). In case a joining request fails, the request may be recast (feedback loop, 650).

Figure 7:
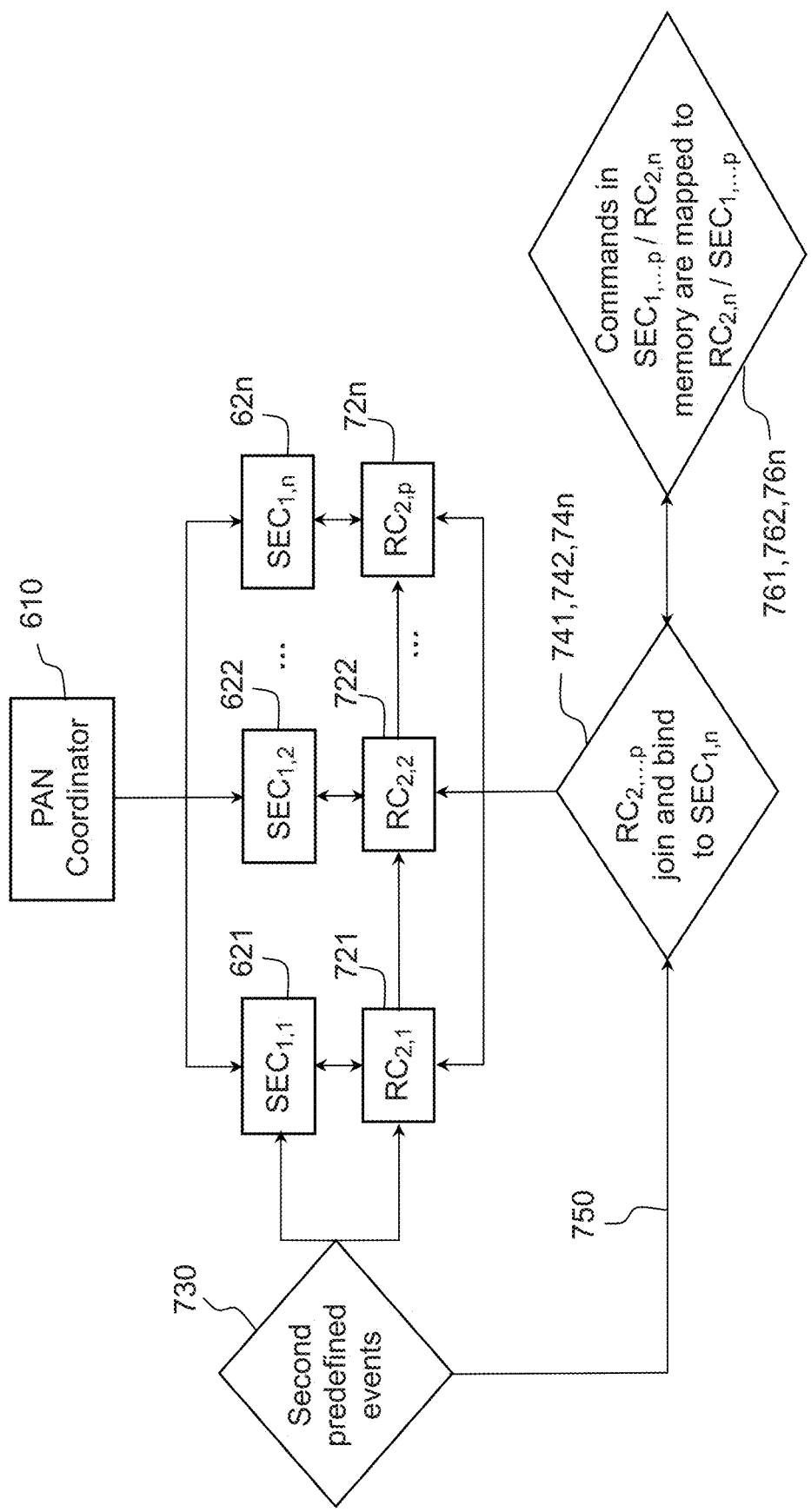
FIGS. 7 and 7a display flow charts of a binding procedure of a remote control according to the invention in a number of its embodiments.
Figure 7A:
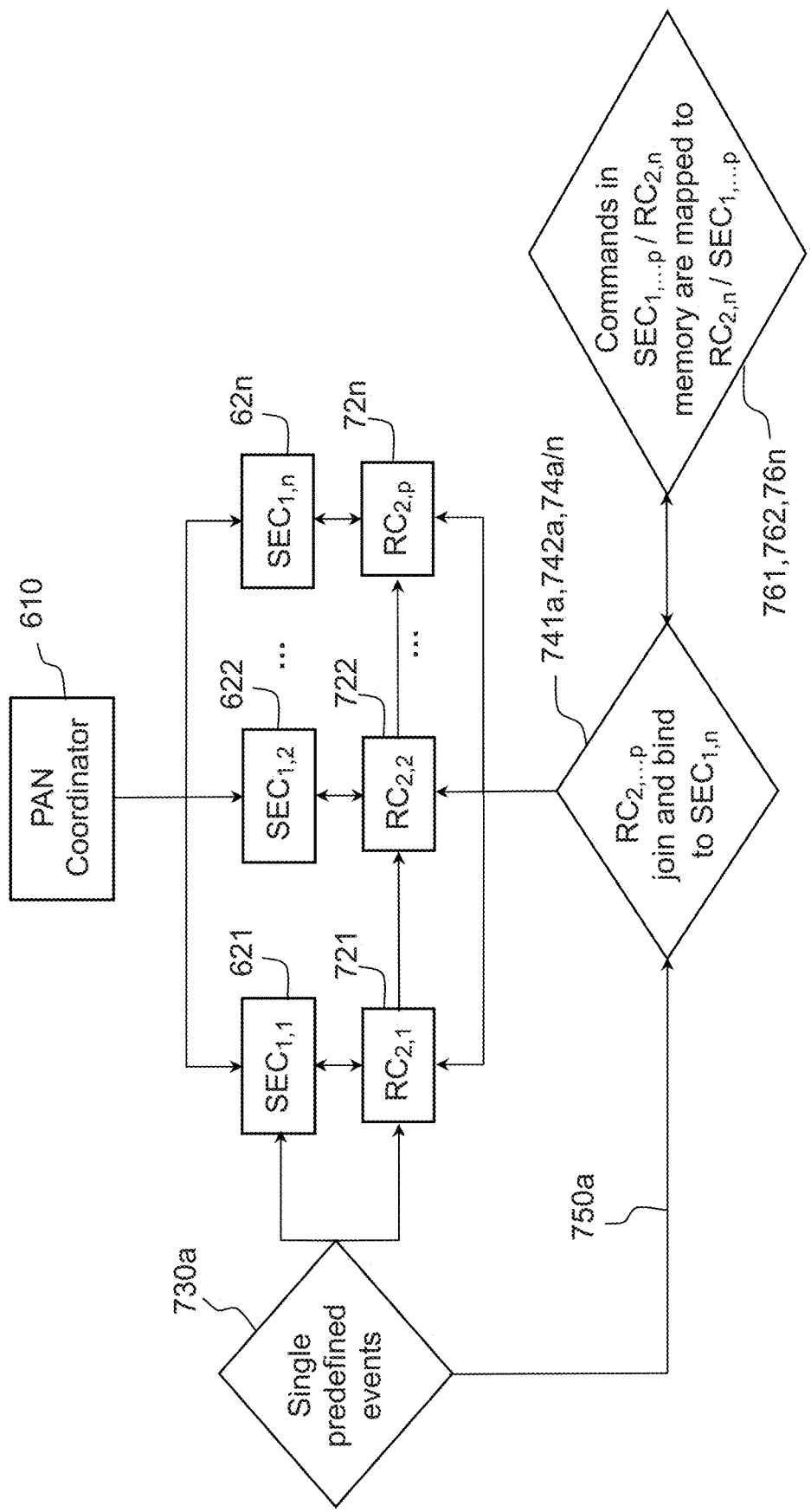

FIGS. 7 and 7a display flow charts of a binding procedure of a remote control according to the invention in a number of its embodiments.

The PAN coordinator and the SECs (or first devices) of FIG. 6 have now joined the network.

Remote Controls (further designated as RCs or second devices) $RC_{2,1}$, 721, $RC_{2,2}$, 722, . . . , $RC_{2,n}$, 72n, have then to be each attached respectively to the first devices $SEC_{1,1}$, 621, $SEC_{1,2}$, 622, . . . , $SEC_{1,n}$, 62n, of the network through a binding procedure.

Binding may also be performed between SECs.

Binding may be triggered by a second predefined event 730 in this example.

In a number of embodiments of the invention, the second predefined event is a "taptap" of the second device on the first device that is detected by an accelerometer in the second and, in a variant also, in the first device. This event or in the variant with an accelerometer in each device the combination of the detections by the two accelerometers, trigger(s) the transmission of the binding request from the second device to the first device. In the latter variant, instead of a shock of one device on the other, the triggering event may be an occurrence within a predefined timeframe of a first shock on one device and a second shock on the other device. As a variant, instead of a detection of a shock or a contact by one or more accelerometers, binding may occur on detection of a proximity by a proximity sensor. In another variant, binding may be triggered on detection of a concomitant change in position of the two devices or of a match of positions of the two devices. Accelerometers may be supplemented by gyrometers and/or magnetometers to measure position and/or orientation of the two devices in a 3D Cartesian frame of reference. With such a sensor arrangement a large number of signatures of the devices will be possible to implement as a way to perform the binding.

In a number of other embodiments, the second predefined event may be a validation by a SEC (first device) of a binding request sent by the RC (second device) using a pair-to-pair communication protocol on an electromagnetic carrier signal. The electromagnetic signal carrying the request may be an infrared carrier, a visible light carrier, an RFID carrier or an NFC carrier. In an embodiment, the signal may have a waveform that is proprietary and is an identifier per se. It may also be an encrypted identifier that is carried by the signal and decrypted at the receiving node.

In a number of variants where the triggering event is an occurrence within a preset timeframe of a plurality of shocks on two or more devices, a validation may be implemented whereby binding is only possible with devices that are within a predefined range. The condition may be verified for instance by a measurement of the Received Signal Strength Indication (RSSI).

Binding is then declared successful for each individual RC (741, 742, . . . , 74n). In case a binding request fails, the request may be recast (feedback loop, 750).

In embodiments of the invention that are implemented purely based on the use of the Zigbee Cluster Library (ZCL), on a binding procedure according to the Zigbee standard, a device that sends a binding request will receive responses from the ZDOs of the network that will list the functionalities (or clusters) that these ZDOs are configured to perform. A library of clusters (Zigbee Cluster Library or ZCL) has been defined by the Zigbee Alliance to cover a number of functionalities for specific applications (Smart Energy, Home Automation, Zigbee Light Link, etc.) A cluster has a server end and a client end, i.e. the server ZDOs are configured to receive commands while the client ZDOs are configured to send commands. The clusters are embedded in the processing logic or memory of the ZDOs. The binding request comprises the list of clusters of the requesting ZDO and their mode (server/client); the receiving ZDOs check if their own configuration can map onto the configuration of the requesting ZDO (i.e. the receiving ZDO is able to implement at least one cluster in a complementary manner—server/client). This procedure defines a list of possible ZDOs to be bound to the requesting ZDO. All the possible ZDOs may be bound or a selection may be made (possibly based on RSSI). The network addresses of the bound ZDOs are stored in a memory of all the ZDOs.

In some embodiments of the invention, on binding a second device to a first device, the change states commands or information transmit commands that are proper to the first device and are stored in the memory of its control circuit or its T/R unit are copied to the memory of the second device, so that the commands that can be understood by the first device will be available to the user on the second device. The copying of the commands may be replaced by a copying of an index in case tables in the memories contain sets of commands that can be matched by the index.

These embodiments may be advantageous to implement sets of commands that are not part of the ZCL, or that are variants of commands that are part of the ZCL. In this case, instead of invoking a cluster previously stored on its memory, the binding ZDO will transfer to its counterpart a copy of a non-ZCL cluster that will be used then by this ZDO as a complementary counterpart of one or more of the clusters that are stored in the memory of the requesting ZDO.

One advantage of these embodiments of the invention is that it is not necessary that the ZDO sends a list of its clusters to the other ZDOs. An underlying assumption will be that the person tasked with commissioning the network will have been given instructions on the devices that may be paired. Alternatively, a specific code may be added in a free portion of the binding request to indicate the hardware/software requirements that a ZDO will have to match to be able to use the commands that the requesting ZDO will transfer to its counterpart.

In an exemplary embodiment, where the first device is connected to an electric roof window (ERW) comprising a rain sensor and the second device comprises a controller of a Controlled Venting Machine (CVM) with a humidity sensor, the commands may be configured so that, notably:
  When the rain sensor of the ERWF detects rain, it sends this information to the CVM, so that this information is factored in the decision to switch the CVM ON/OFF;
  When the humidity sensor of the CVM detects a high humidity level, the CVM sends this information to the ERWF, so that it opens, unless its rain sensor detects that it rains.

A processing logic configured to execute this exchange of information may be embedded in a memory of the SEC of the ERW or in a memory of the CVM controller, or split between the two memories.

Based on this example, it can be understood more generally that the mapping of the commands at the time of binding may be performed from memory of the first device to the memory of the second device, alternatively from the memory of the second device to the memory of the first device or with a bi-directional combination.

In some embodiments of the invention, joining of the RC is also triggered by the second predefined event that is then merged with the first predefined event. In this variant that is illustrated on FIG. 7a, the single predefined event 730a triggers at the same time the joining and binding 741a, 742a, 74n/a (with a return loop 750a to the generation of the single predefined events 730a.

Figure 8:
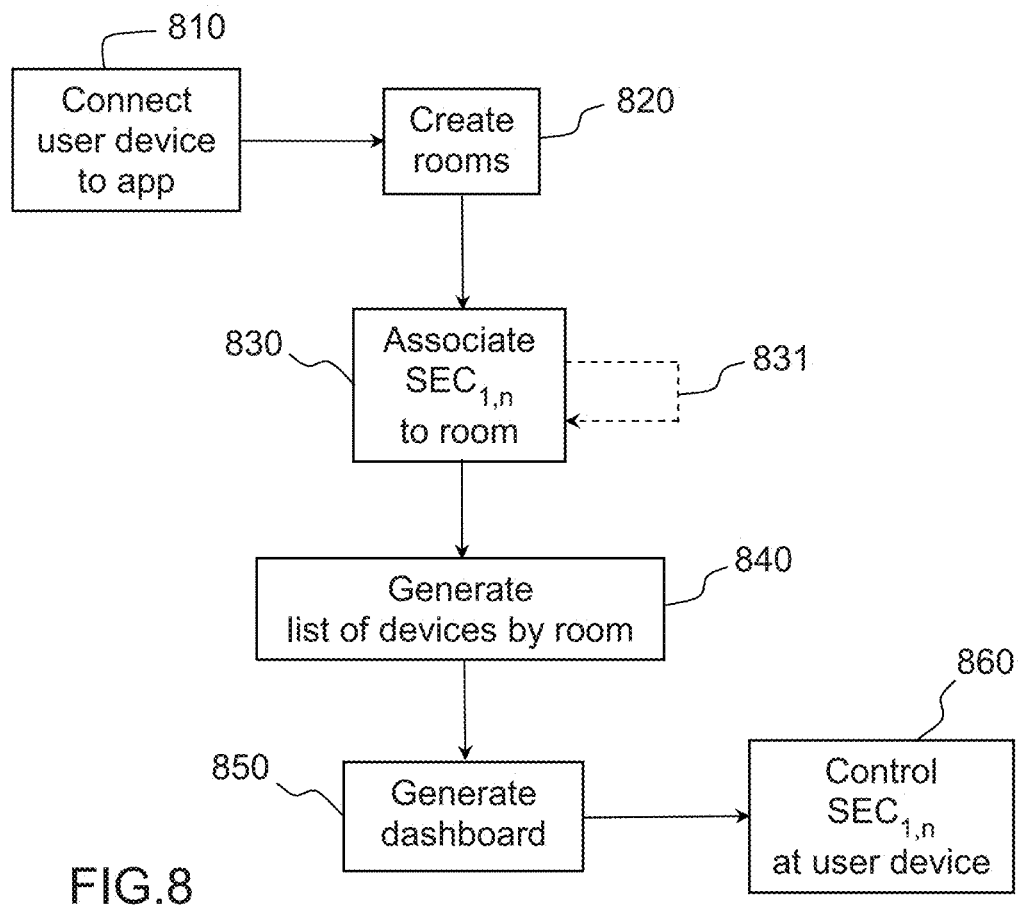
FIG. 8 displays a flow chart of a personalization procedure of a network according to the invention in a number of its embodiments.

FIG. 8 displays a flow chart of a personalization procedure of a network according to the invention in a number of its embodiments.

As explained in relation to FIGS. 4a to 4g, in a number of embodiments of the invention, personalization of the HAN/LAN may be performed locally or remotely with a user device that may be connected to the HAN/LAN by a gateway.

At a step 810, the user device (similar to a device 541) is connected to the HAN through an application configured for this purpose.

At a step 820, the user creates/configures the rooms of the building. The user may personalize the names to designate the rooms.

At a step 830, the user associates the SECs (or first devices) to the room where he/she is located. Association may be, for instance, simply performed by a taptap on the device, if the device is equipped with an accelerometer. Alternatively, association may be performed by a gesture of the user proximal to the device, if the device is equipped with a proximity sensor. If an association fails, in a variant it may be redone through a feed-back loop 831.

At a step 840, a list of the devices in a definite room is generated once the association process is complete.

At a step 850, once the devices of all the rooms have been personalized, a dashboard of the building, comprising widgets of the rooms, may be generated. Once this is done, the user will be able to control the SECs/first devices either using the RCs/second devices that have been bound to the SECs/first devices or using the application, locally or remotely. In some embodiments, the application is available on a server (belonging to the end user or managed by a third party) and may be accessed from any device configured to be accessible by the user. In some embodiments, the server may provide to the user device some information on other buildings on a map, if the user has accepted to share his/her data. Also, the server may provide some information on forecast data that may be useful to the users, as weather forecast data, forecast power failures, or other data in relation with the applications that the user has installed.

Figure 9:
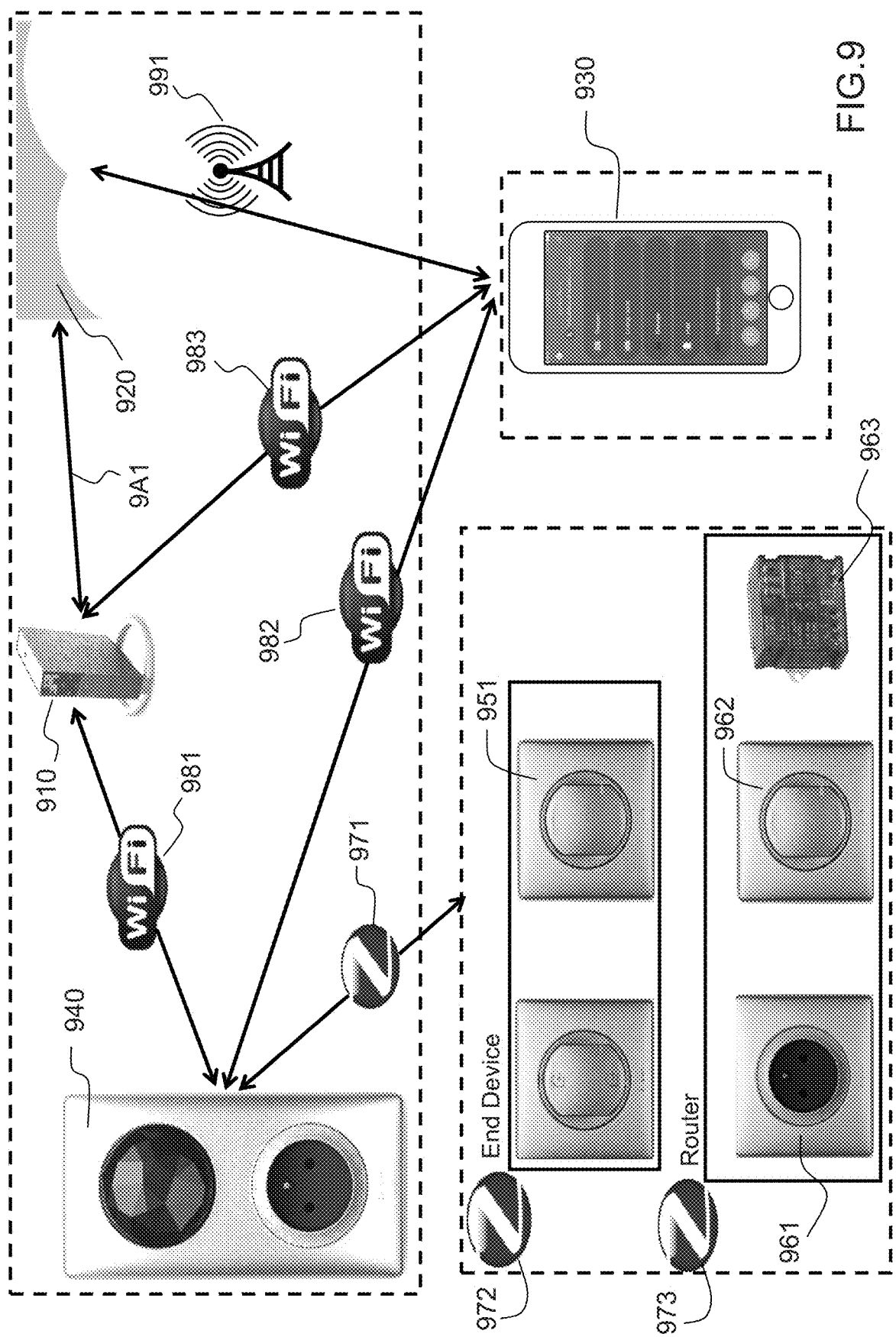
FIG. 9 displays an exemplary embodiment of a plurality of devices connected to a network in some embodiments of the invention.

FIG. 9 displays an exemplary embodiment of a plurality of devices connected to a network in some embodiments of the invention.

The Home Area Network (or LAN or PAN or Building Area Network) used to connect the devices of the invention to the outside world has a gateway 910 may be a WiFi network 981, 982, 983 that may connect to the cloud 920 through a connection 9A1 that is generally wired (ADSL, fiber, etc. . . . ) but could also be wireless (cellular, satellite, etc. . . . ).

A Zigbee network 971, 972, 973 connects a Zigbee PAN coordinator 940, Zigbee end devices 951, 952, and Zigbee routers 961, 962, 963. The Zigbee PAN coordinator 940 may also be a gateway and may be of the type 340c represented on FIG. 3c and described in relation to this figure. The Zigbee gateway 940 may be connected to the LAN gateway 910 by a WiFi connection 981 and get thus access to the cloud/internet to send/receive data/commands. The Zigbee network comprises "Routers" 961, 962, 963. A Zigbee router is a ZDO that is able to act as a relay of communication in the network when configured in a cluster tree or mesh architecture. ZDOs have to be connected to a power line. This is one of the reasons why SECs will normally be routers. A Zigbee end device is a ZDO that cannot act as a relay of communication. Also, it may be powered by batteries instead of a power line. Thus, RCs will normally be end devices.

A user terminal 930 such as the user terminal depicted on FIGS. 4a through 4d or represented as reference 541 on FIG. 5 may connect directly to the Zigbee gateway 940 or indirectly, through the Wi-Fi gateway 910, and possibly in addition through an Internet connection, that may be accessed remotely, for example using a cellular communication 991.

The various elements depicted on the figure may not be all present in specific embodiments of the invention. The invention may be implemented with only some of the components, for instance with network end devices 951, 952 and network routers 961, 962, 963, with one of the routers acting as a PAN coordinator.

As already discussed above, other physical layers, architectures, or protocols than those illustrated on the figure may also be used without departing from the scope of the invention.

Figure 10B:
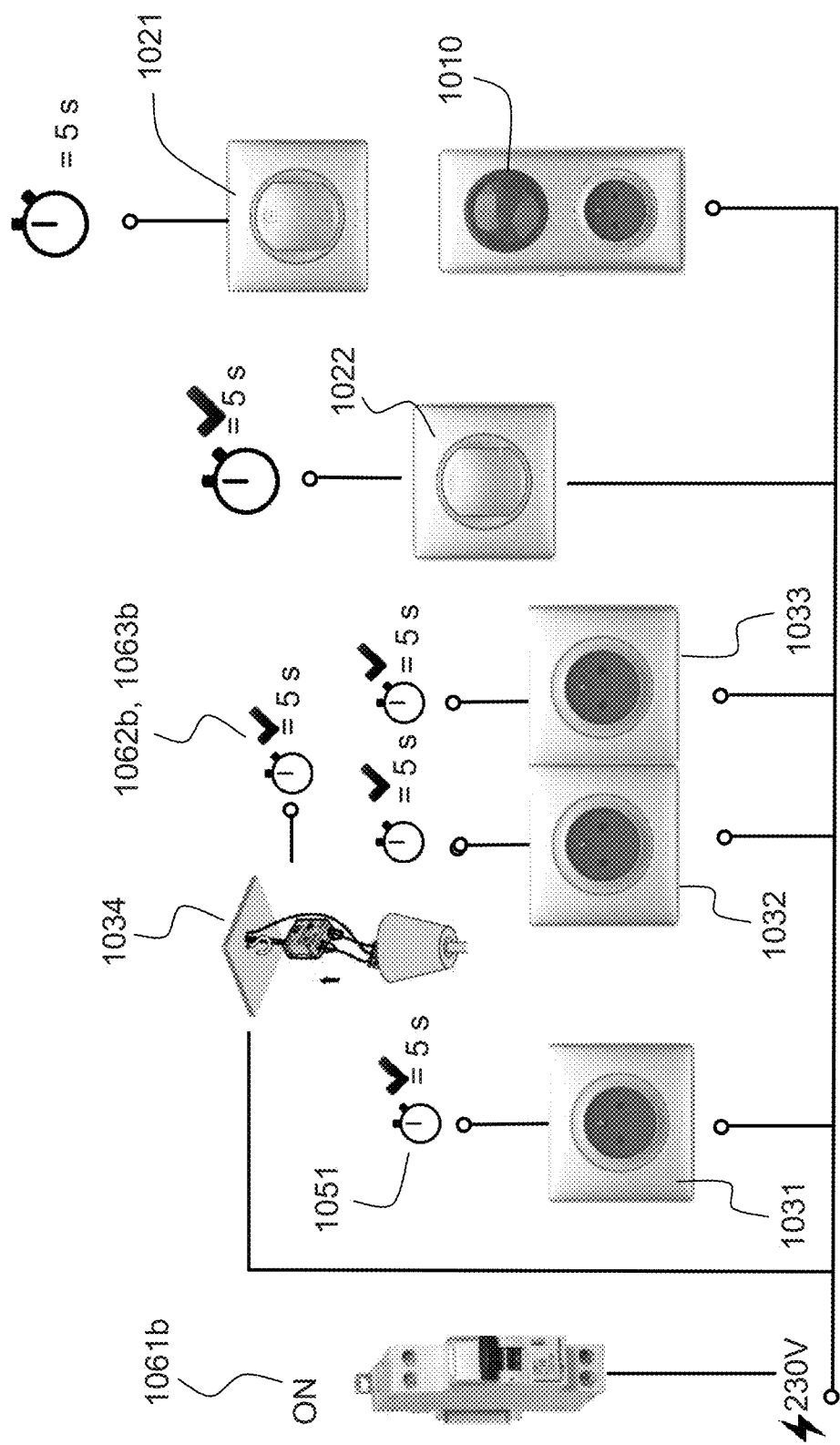

FIGS. 10a and 10b display successive steps of an exemplary joining procedure for network devices in some embodiments of the invention.

Gateway 1010 is connected to the power line 1040, that may be ON or OFF. SECs 1031, 1032, 1033, 1034 are also connected to the power line. SECs 1031, 1032, 1033 are plugs into which any kind of electric appliance may be connected. SEC 1034 is a lamp. Device 1021 is a RC not connected to the power line (i.e. battery powered), whereas device 1022 is a RC that is connected to the power line. All devices have a clock or counter 1051.

According to some aspects of the invention illustrated on FIG. 10a, the joining procedure may start by the joining of device 1021. A push on the device will start a count in the clock of the device (1061); the network will open 1063 when the joining request has been accepted by the gateway (or PAN coordinator) 1010 if the count 1062 does not exceed a preset duration/count.

Then, as illustrated on FIG. 10b, the other devices 1022, 1031, 1032, 1033, 1034 connected to the power line 1040 may be joined by a procedure wherein the power line being switched ON, 1061b, starts the count on the clocks, 1062b, of the devices. If the joining request sent at the same time either to device 1021 or to the gateway/PAN coordinator 1010 is validated by the recipient before lapse of a preset duration/count, 1063b. In the example of the figure, the preset duration is 5 s. But of course, other values may be selected.

Figure 11:
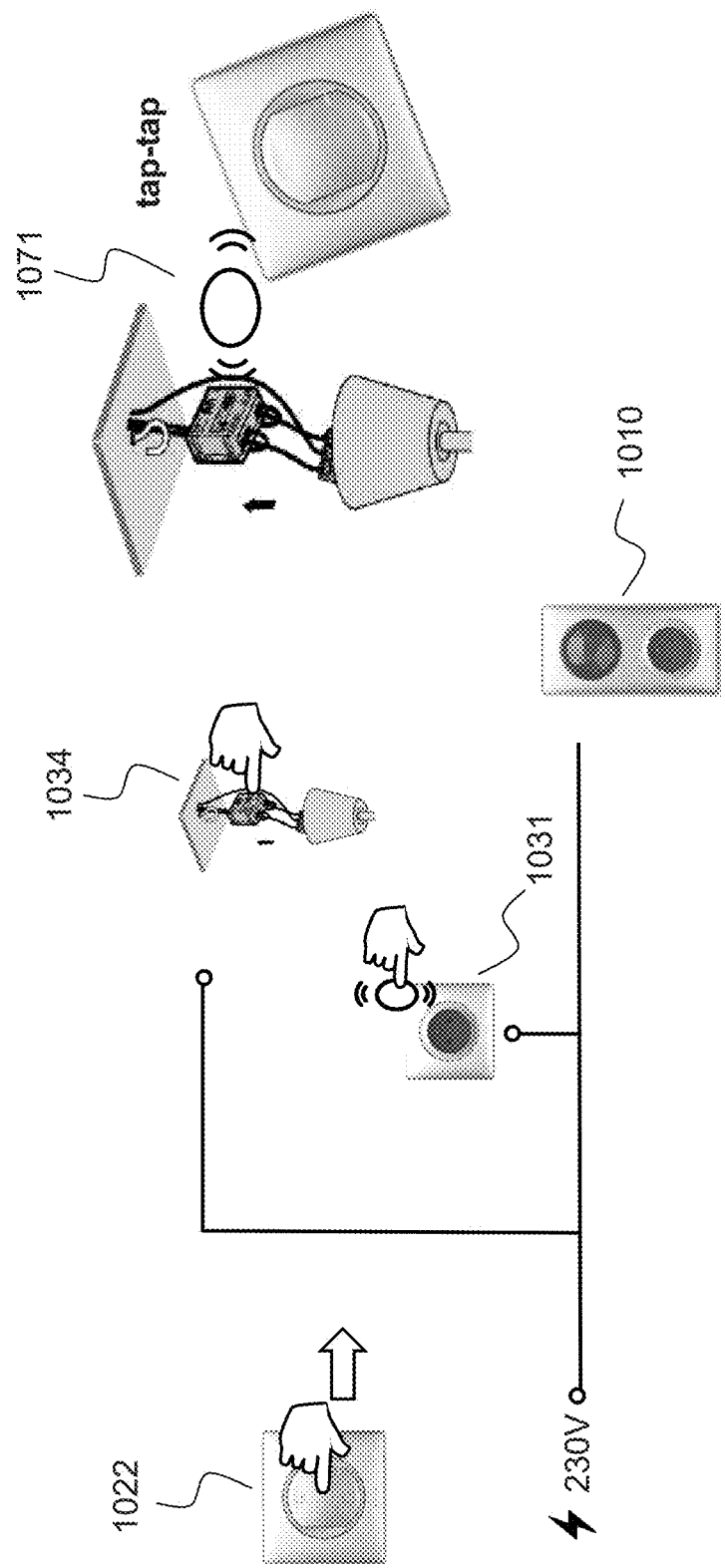
FIG. 11 displays an exemplary joining and binding procedure for network devices in some embodiments of the invention.

FIG. 11 displays an exemplary joining and binding procedure for network devices in some embodiments of the invention.

Devices 1021, 1031, 1034 join the network by a power up of the type described on FIGS. 10a and 10b, or by another procedure. According to certain aspects of the invention, RC 1021 is then bound to SEC 1034 by a tap-tap 1071 as described above. One or each of the devices comprises an accelerometer. The detection by one or two accelerometer(s) of a shock between the two devices triggers a binding request that is then validated. On binding, at least the reference of a bound device is saved to the memory of the other bound device. The information that will be exchanged between the two devices being referenced in at least one of the memories, this will allow an automatic mapping of the exchange of information/commands between the two devices.

The examples disclosed in this specification are only illustrative of some embodiments of the invention. They do not in any way limit the scope of said invention which is defined by the appended claims.

The invention claimed is:

1. A smart electric controller comprising:
a communication link to an RF network;
a processor;
a memory storing a table of data representative of a plurality of states of the smart electric controller or values measured or received at the smart electric controller;
the processor being configured to:
cause a joining of the smart electric controller to the RF network on one of a first predefined event or a single predefined event;
cause a binding of a remote control to the smart electric controller on one of a second predefined event, or the single predefined event, said one of the second predefined event or the single predefined event being triggered by the detection the one or more positions of the smart electric controller relative to the remote control match a predefined condition.

2. The smart electric controller of claim 1, wherein the binding causes an initialization of a table of commands to be exchanged between the remote control and the smart electric controller, said table of commands matching at least part of the table of data.

3. The smart electric controller of claim 2, wherein the initialization results from a copy to/from the memory of the smart electric controller from/to a memory of the remote control of at least part of the table of data.

4. The smart electric controller of claim 1, further comprising one or more sensors, wherein some of the data in the memory of the smart electric controller characterize an output of the one of more sensors.

5. The smart electric controller of claim 4, wherein the table of commands comprises one or more of change state commands or send sensor output commands.

6. The smart electric controller of claim 5, wherein the processor is further configured to cause a sensor whose output is listed in the table of data of the smart electric controller to send an output to the remote control when a corresponding received input data is present in a table of data of the remote control.

7. The smart electric controller of claim 1, wherein the joining and binding requests from the smart electric controller are received at a network node, the joining and binding requests being transmitted by an electromagnetic signal.

8. The smart electric controller of claim 1, further comprising a connection to a power line.

9. The smart electric controller of claim 1, wherein the first predefined event or the single predefined event is a validation of a joining request from the smart electric controller received at a network node before a predefined time has elapsed after activation of a connection of the smart electric controller to the power line.

10. The smart electric controller of claim 1, wherein the one of the second predefined event or the single predefined event comprises one of a shock, a physical contact, a physical proximity, a change of position or a match of position of the remote control relative to the smart electric controller.

11. The smart electric controller of claim 1, wherein the one of the second predefined event or the single predefined event comprises an electromagnetic signal transmitted by the remote control to the smart electric controller.

12. The smart electric controller of claim 11, wherein the electromagnetic signal is one of an optical signal, an RFID signal or a NFC signal.

13. The smart electric controller of claim 1, wherein the RF network comprises a gateway enabling a communication with the smart electric controller and a user device.

14. The smart electric controller of claim 13, wherein the processor is further configured to exchange one or more personalizing information with the user device through the gateway.

15. The smart electric controller of claim 14, wherein the one or more personalizing information comprise one or more of assigning a location, a type or a program to execute to the smart electric controller.

16. The smart electric controller of claim 14, further configured to send data captured at one or more of the smart electric controller or the remote control to the user device through the gateway.

17. An equipment having the smart electric controller of claim 1 attached thereto, the equipment selected in a group comprising plugs, switches, lamps, heating gear, cooling gear, actionable windows, actionable shutters, actionable blinders, cooking equipment, food preservation equipment, cleaning devices, entertainment devices, security systems.

* * * * *